(12) United States Patent
Xin et al.

(10) Patent No.: US 12,107,715 B2
(45) Date of Patent: Oct. 1, 2024

(54) DATA TRANSMISSION METHOD AND APPARATUS, DEVICE, AND STORAGE MEDIUM

(71) Applicant: ZTE CORPORATION, Shenzhen (CN)

(72) Inventors: Yu Xin, Shenzhen (CN); Tong Bao, Shenzhen (CN); Guanghui Yu, Shenzhen (CN); Liujun Hu, Shenzhen (CN); Jin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/014,718

(22) PCT Filed: May 20, 2021

(86) PCT No.: PCT/CN2021/094797
§ 371 (c)(1),
(2) Date: Jan. 5, 2023

(87) PCT Pub. No.: WO2022/007507
PCT Pub. Date: Jan. 13, 2022

(65) Prior Publication Data
US 2023/0353438 A1    Nov. 2, 2023

(30) Foreign Application Priority Data
Jul. 7, 2020 (CN) .......................... 202010647195.4

(51) Int. Cl.
*H04L 27/26* (2006.01)
(52) U.S. Cl.
CPC ........ *H04L 27/2636* (2013.01); *H04L 27/261* (2013.01); *H04L 27/2614* (2013.01); *H04L 27/26265* (2021.01)

(58) Field of Classification Search
CPC .......... H04L 27/2636; H04L 27/26265; H04L 27/261; H04L 27/2614
See application file for complete search history.

(56) References Cited

U.S. PATENT DOCUMENTS 9,960,945 B2 *    5/2018   Joung ................. H04B 1/7073
2007/0165730 A1 *  7/2007  Whinnett ............ H04L 27/2614
                                                         375/260

(Continued)

FOREIGN PATENT DOCUMENTS

CN          1809047 A      7/2006
CN        107026809 A      8/2017

(Continued)

OTHER PUBLICATIONS

International Search Report and Written Opinion dated Aug. 12, 2021 in corresponding International Application No. PCT/CN2021/094797, translated, 14 pages.

(Continued)

*Primary Examiner* — Jaison Joseph
(74) *Attorney, Agent, or Firm* — MH2 TECHNOLOGY LAW GROUP LLP (57) ABSTRACT

A data transmission method includes: performing M-point discrete Fourier transform (DFT) on first time domain data to obtain frequency domain data; performing a filtering operation on the frequency domain data to obtain filtered frequency domain data; performing N-point inverse discrete Fourier transform (IDFT) on the filtered frequency domain data to obtain second time domain data; and transmitting the second time domain data on a physical resource.

19 Claims, 3 Drawing Sheets

(56) References Cited

U.S. PATENT DOCUMENTS

| | | | |
|---|---|---|---|
| 2008/0075191 A1* | 3/2008 | Haartsen | H04L 27/2615 |
| | | | 375/296 |
| 2012/0250614 A1* | 10/2012 | Anekoji | H04B 1/001 |
| | | | 370/328 |
| 2014/0328375 A1* | 11/2014 | Dahlman | H04B 1/713 |
| | | | 375/133 |
| 2018/0062808 A1* | 3/2018 | Lee | H04L 5/0091 |
| 2018/0091343 A1* | 3/2018 | Wang | H04L 27/263 |
| 2019/0028312 A1* | 1/2019 | Xin | H04L 25/03834 |
| 2019/0028317 A1* | 1/2019 | Xin | H04L 27/26416 |
| 2019/0052486 A1* | 2/2019 | Kuchi | H04L 27/2614 |
| 2020/0162304 A1* | 5/2020 | Xin | H04L 27/26416 |
| 2021/0099330 A1* | 4/2021 | Ferdinand | H04L 27/2636 |
| 2022/0021570 A1* | 1/2022 | Hu | H04L 27/2636 |
| 2022/0173949 A1* | 6/2022 | Liu | H04L 25/03834 |
| 2023/0188396 A1* | 6/2023 | Pajukoski | H04L 27/26414 |
| | | | 370/329 |
| 2023/0353438 A1* | 11/2023 | Xin | H04L 27/26265 |

FOREIGN PATENT DOCUMENTS

| | | |
|---|---|---|
| CN | 110971554 A | 4/2020 |
| CN | 111901279 A | 11/2020 |

OTHER PUBLICATIONS

European Extended Search Report dated Jun. 25, 2024 in corresponding European Application No. 21837262.1, 11 pages.

Nokia et al. "Way forward waveform for carrier frequencies beyond 40 GHz," 3GPP TSG-RAN WG1#86bis, Lisbon, Portugal, Oct. 9, 2016, 8 pages [retrieved on Oct. 9, 2016]. Retrieved from Nokia, Alcatel-Lucent Shanghai Bell, Mitsubishi Electric, InterDigital Communications using Internet: <URL:http://www.3gpp.org/ftp/Meetings_3GPP_SYNC/RAN1/Docs/>.

Mitsubishi Electric, "UW DFTsOFDM performance evaluation above 40GHz," 3GPP TSG-RAN WG1 NR-AH 1701, Spokane, Washington, Jan. 16-20, 2017, 10 pages [retrieved on Jan. 16, 2017]. Retrieved from the Internet: < URL: http://www.3gpp.org/ftp/Meetings_3GPP_SYNC/RAN1/Docs/>.

* cited by examiner

DATA TRANSMISSION METHOD AND APPARATUS, DEVICE, AND STORAGE MEDIUM

CROSS-REFERENCE TO RELATED APPLICATIONS

This application is a national phase entry under 35 USC 371 of International Patent Application No. PCT/CN2021/094797, filed on May 20, 2021, which claims priority to Chinese Patent Application No. 202010647195.4 filed with the Chinese Patent Office on Jul. 7, 2020, which are incorporated herein by reference in their entirety.

TECHNICAL FIELD

The present disclosure relates to the field of communication technologies, for example, to a data transmission method, a data transmission apparatus, a device and a storage medium.

BACKGROUND

In some high frequency scenarios, it is required that the transmitted signal has a low peak to average power ratio (PAPR). However, the transmitted signal for data transmission has a high PAPR, which cannot meet the requirements of some high frequency scenarios.

SUMMARY

In a first aspect, embodiments of the present disclosure provide a data transmission method. The data transmission method includes: performing M-point discrete Fourier transform (DFT) on first time domain data to obtain frequency domain data; performing a filtering operation on the frequency domain data to obtain filtered frequency domain data; performing N-point inverse discrete Fourier transform (IDFT) on the filtered frequency domain data to obtain second time domain data; and transmitting the second time domain data on a physical resource.

In a third aspect, embodiments of the present disclosure provide a device. The device includes one or more processors and a memory configured to store one or more programs. The one or more programs, when executed by the one or more processors, cause the one or more processors to implement the data transmission method as described in any of the embodiments of the present disclosure.

In a fourth aspect, embodiments of the present disclosure provide a non-transitory computer-readable storage medium. The non-transitory computer-readable storage medium has stored thereon a computer program, and the computer program, when executed by a processor, implements the data transmission method as described in any of the embodiments of the present disclosure.

DETAILED DESCRIPTION

Embodiments of the present disclosure will be described below with reference to the accompanying drawings. The embodiments in the present disclosure and features in the embodiments may be arbitrarily combined with each other, provided that there is no conflict.

The steps shown in the flow diagram of the accompanying drawings may be executed by means of a computer system such as a set of computer-executable instructions. In addition, although the logical order is shown in the flow diagram, in some cases, the steps shown or described may be performed in an order different from the order given herein.

In high frequency scenarios, the phase noise is very large. Even if phase compensation is performed at the receiver side, there will still be a lot of phase noise left; therefore, an appropriate modulation scheme or waveform scheme needs to be designed to reduce the influence of phase noise. In high frequency scenarios, the Doppler shift is very large. Even if frequency offset compensation is performed at the receiver side, there will still be phase deviations left in data symbols; therefore, an appropriate modulation scheme or waveform scheme needs to be designed to reduce the influence of phase deviation.

In high frequency scenarios, path loss and shadow attenuation are very large, so signal-to-noise ratios in some areas at the edge of a cell will be very low. Moreover, the efficiency of the high-frequency power amplifier (PA) is relatively low. In order to improve the signal-to-noise ratio and reduce the power consumption of the battery of the user equipment (UE), the PAPR of the signal transmitted by the UE needs to be relatively low.

In the scenario of massive machine type of communication (mMTC), it is desired that the power consumption of the battery of some terminal devices be substantially reduced, for example, the battery life be extended to over a decade. Therefore, in order to improve the efficiency of the PA of the terminal device, the PAPR of the signal transmitted by the terminal device needs to be lowered. In particular, in the case of non-orthogonal access of a large number of terminal devices, the signal to interference plus noise ratio (SINR) is very low.

In current 5G New Radio (NR) standard, although the PAPRs of discrete Fourier transform-spread-orthogonal frequency division multiplexing (DFT-s-OFDM) signals are low, it is still difficult to meet the low PAPR requirements of application scenarios of beyond five generation (B5G) mobile communication technology or sixth generation (6G) mobile communication technology. Another requirement of B5G and 6G is to reduce out-of-band leakage. Low out-of-band leakage not only reduces the interference between frequency bands, but also reduces out-of-band power waste, which is equivalent to further improving the efficiency of the PA.

Figure 1:
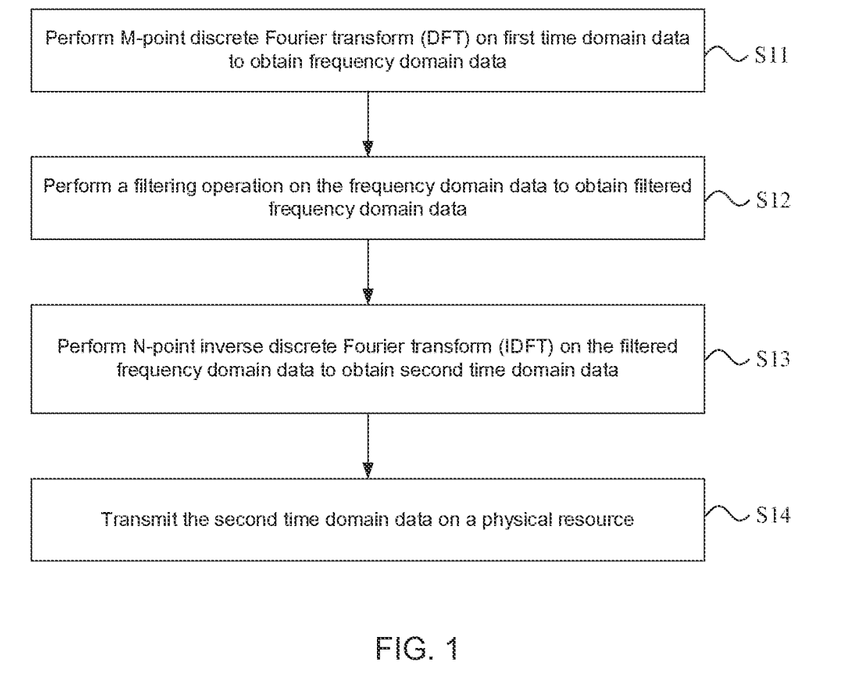
FIG. 1 is a flow diagram of a data transmission method provided by embodiments of the present disclosure.

In an embodiment, a data transmission method is provided. As shown in FIG. 1, the data transmission method provided in this embodiment mainly includes steps S11, S12, S13, and S14.

In S11, M-point discrete Fourier transform (DFT) is performed on first time domain data to obtain frequency domain data.

In S12, a filtering operation is performed on the frequency domain data to obtain filtered frequency domain data.

In S13, N-point inverse discrete Fourier transform (IDFT) is performed on the filtered frequency domain data to obtain second time domain data.

In S14, the second time domain data is transmitted on a physical resource.

In this embodiment, an execution body of the embodiment is a transmitting node, and the transmitting node may be a user equipment. The first time domain data may refer to first data in time domain, the second time domain data may refer to second data in time domain, and the frequency domain data refers to data in frequency domain.

A signal may be converted from a time domain to a frequency domain with the use of DFT, and then the frequency spectrum of and the law of variation in the signal may be analyzed. A signal may be converted from the frequency domain to the time domain with the use of IDFT.

In an exemplary embodiment, the first time domain data is contained in L data symbol blocks, and a length of a data symbol block is M. A head of each data symbol block includes a same data sequence, and a tail of each data symbol block includes a same data sequence.

In this embodiment, the L data symbol blocks are L continuous data symbol blocks, and the data symbols may be orthogonal frequency division multiplexing (OFDM) symbols. A length of each data symbol block in the L data symbol blocks is M, that is, each data symbol block includes M pieces of time domain data.

In an embodiment, performing M-point DFT on the first time domain data may be understood as performing M-point DFT on L continuous data symbol blocks.

For the L continuous data symbol blocks, M-point DFT is performed separately, then the filtering operation is performed separately in the frequency domain, and finally N-point IDFT is performed separately. The time domain data after IDFT is transmitted on a physical resource. Herein, L, M, and N are integers greater than 1, and N is greater than M.

In an exemplary embodiment, R reference signal symbol blocks and L data symbol blocks are included in a time slot. A head of a reference signal symbol block includes a same data sequence as the head of the data symbol block, and a tail of the reference signal symbol block includes a same data sequence as the tail of the data symbol block. Herein, R is a positive integer.

The head of each data symbol block includes a same data sequence, and the tail of each data symbol block includes a same data sequence. The data sequence of the head is not identical to the data sequence of the tail.

The data sequences of the heads of all reference signal symbol blocks and data symbol blocks in the time slot are the same, and the data sequences of the tails of all reference signal symbol blocks and data symbol blocks in the time slot are also the same. In this way, the out-of-band leakage is very low, and a tail of a former OFDM symbol is a cyclic prefix (CP) of a latter OFDM symbol, which saves the overhead of the CP. In addition, the reference signal sequences of the head and tail are sequences known to the receiver side, which can be used to perform phase noise estimation, channel estimation, synchronization, etc.

In an exemplary embodiment, a reference sequence in the reference signal symbol block includes one or more of: a sequence obtained after binary phase shift keying (BPSK) modulation, a Zadoff-Chu sequence, or a Golay sequence.

In an exemplary embodiment, a filter function used in the filtering operation includes a root raised cosine function or a raised cosine function.

In an exemplary embodiment, an expression of the raised cosine function y(f) in frequency domain is as follows:

$$y(f) = \begin{cases} A & 0 \le |f| < f_0(1-\alpha) \\ \frac{A}{2}(1 + \cos(\frac{|f| - f_0(1-\alpha)}{2f_0\alpha}\pi)) & f_0(1-\alpha) \le |f| < f_0(1+\alpha) \\ 0 & |f| \ge f_0(1+\alpha) \end{cases}$$

Where A is a constant, a is a roll-off factor, a is any value between 0 and 1, |.| is an absolute value operator, and $f_0$ is half of a half-value width of the raised cosine function.

In this embodiment, $2f_0$ may be recorded as a half-value width of the raised cosine function. $2f_0(1+a)$ is a length of the filter function, i.e., a length of an interval of an independent variable corresponding to a non-zero function value.

In an exemplary embodiment, the root raised cosine function is a square root of the raised cosine function.

The root raised cosine function is a square root of the raised cosine function, and its expression sry(f) is: sry(f)= $\sqrt{y(f)}$.

In an exemplary embodiment, in a case where a roll-off factor of the root raised cosine function is greater than 0, the half-value width of the root raised cosine function is less than or equal to the length of the data symbol block before the filtering operation.

In the case where the roll-off factor of the root raised cosine function is greater than 0, the half-value width is less than the length of the frequency domain data before the filtering operation, so as to realize that the length of the filter function is equal to the length of the frequency domain data before the filtering operation. In this way, it may be possible to achieve the characteristic of the filter function that a modulus value at the middle is greater than a modulus value at an edge without increasing a bandwidth of a transmission band, and thus improve the spectrum efficiency.

In an exemplary embodiment, the filter function used in the filtering operation satisfies the following condition: in an interval of an independent variable corresponding to a non-zero filter function value, a modulus of a filter function value at the middle is greater than a modulus of a filter function value in an edge area.

The modulus of the filter function value in the edge area refers to the modulus of the filter function value in the edge area of the interval of the independent variable.

The edge area refers to an area away from an intermediate area in the interval of the independent variable, the intermediate area refers to an area at the middle of the interval of the independent variable, and the filter function value at the middle refers to a function value corresponding to the intermediate area.

A same sequence is inserted at heads and tails of L continuous data symbol blocks, M-point DFT is performed on each data symbol block separately, and then the filtering operation is performed in frequency domain, so that the characteristic of the filter function is that the modulus value at the middle is greater than the modulus value at the edge. In this way, not only the PAPR of the waveform scheme may be reduced, but also the crosstalk of a data portion of the OFDM symbols to the sequence inserted at the tail after oversampling may be reduced. As a result, it may be ensured that the tail of a former OFDM symbol after oversampling is the cyclic prefix of a latter OFDM symbol.

In an exemplary embodiment, the description that the modulus of the filter function value at the middle is greater than the modulus of the filter function value in the edge area includes that: as the independent variable changes from an intermediate value to a boundary value, a modulus of a filter function value corresponding to the independent variable decreases monotonically.

In an exemplary embodiment, the description that the modulus of the filter function value at the middle is greater than the modulus of the filter function value in the edge area includes that: a modulus of any filter function value in an area of the independent variable, a length of which is half of a total length of the interval of the independent variable, is greater than or equal to a modulus of a filter function value in an adjacent area.

In an exemplary embodiment, the description that the modulus of the filter function value at the middle is greater than the modulus of the filter function value in the edge area includes that: as the independent variable changes from an intermediate value to a boundary value, a modulus of a filter function value corresponding to the independent variable decreases monotonically, and a modulus of the filter function value corresponding to the independent variable approaches 0.

In an exemplary embodiment, a length of a filter function used in the filtering operation is greater than or equal to a length of the frequency domain data before the filtering operation.

The description that the length of the filter function is greater than or equal to the length of the frequency domain data before the filtering operation may be understood as that the length of the filter function is greater than or equal to a product of M and $f_{sc}$ ($M \times f_{sc}$), $f_{sc}$ being a subcarrier spacing.

In an exemplary embodiment, before performing the filtering operation on the frequency domain data, the data transmission method further includes: cyclically extending the frequency domain data; or, copying and lengthening the frequency domain data.

In an exemplary embodiment, a length of a filter function used in the filtering operation is less than or equal to a length of the frequency domain data that has been cyclically extended; or, the length of the filter function used in the filtering operation is less than or equal to the length of the frequency domain data that has been copied and lengthened.

In an exemplary embodiment, before performing the filtering operation on the frequency domain data, the data transmission method further includes: placing, at a head of the frequency domain data, a data segment at a tail of the frequency domain data that was copied; and placing, at the tail of the frequency domain data, a data segment at the head of the frequency domain data that was copied.

In an exemplary embodiment, performing the filtering operation on the frequency domain data includes: performing filtering on the frequency domain data using the root raised cosine function, and then performing filtering on the filtered frequency domain data using a preset function.

Further, the filter function, including the root raised cosine function, used for performing the filtering operation may be that: filter(f)=sry(f)·o(f), where o(f) is another filter function, i.e., the above-mentioned preset function, and sry(f) is the root raised cosine function. That is, the filtering operation also includes performing another filtering using another function after filtering is performed using the root raised cosine function.

In an exemplary embodiment, transmitting the second time domain data on a physical resource includes:

transmitting the second time domain data on a radio frequency link after digital-to-analog conversion is performed on the second time domain data.

Figure 2:
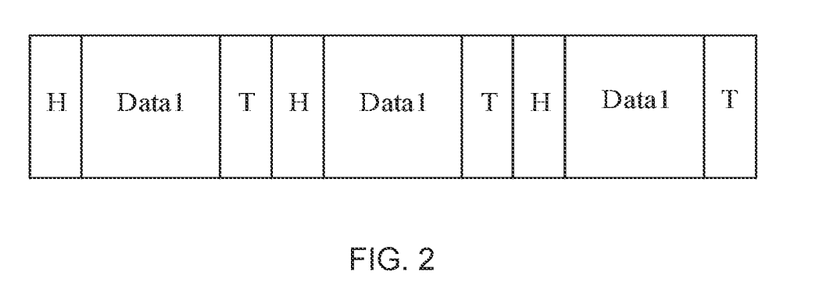
FIG. 2 is a schematic diagram showing a structure of data symbols provided by embodiments of the present disclosure.

In an embodiment, a basic symbol block structure of time domain data is provided.

As shown in FIG. 2, a length of each OFDM symbol in the figure is M, and M is a sum of a length of a head sequence H, a length of data Data and a length of a tail sequence T. The head sequence H of each data symbol block(i.e., OFDM symbols) is the same, the tail sequence T of each data symbol block (i.e., OFDM symbols) is the same, and the data portions of the OFDM symbols are different, which are denoted as Data1, Data2, Data3, etc.

Figure 3:
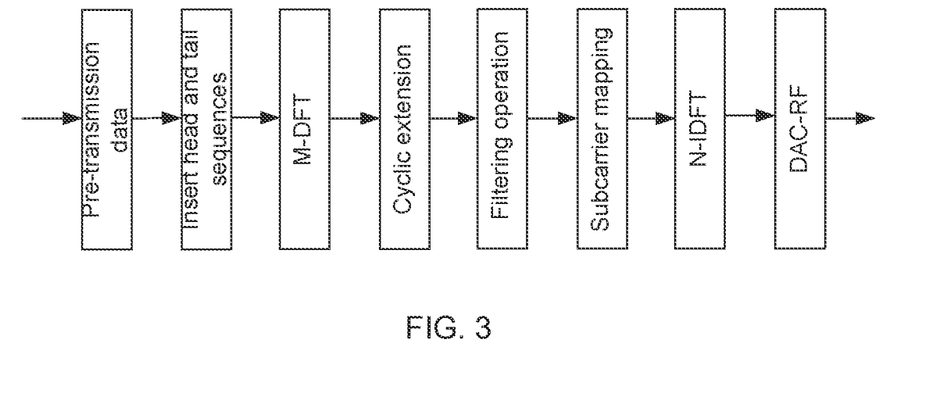
FIG. 3 is a block diagram showing a structure of a transmitting side of a data transmission method provided by embodiments of the present disclosure.

In an embodiment, a block diagram showing a structure of a transmitting side of a data modulation method is provided.

As shown in FIG. 3, at the transmitting side, pre-transmission data is inserted into the head sequence and the tail sequence, and then time domain data is converted to frequency domain data through M-point DFT (i.e., M-DFT). Next, the frequency domain data is cyclically extended, and a filtering operation is performed on the extended frequency domain data. The filtered frequency domain data is mapped on corresponding subcarriers, and then zero data subcarriers are added to achieve oversampling. The frequency domain data is converted to the time domain data through N-point IDFT (i.e., N-IDFT), and the generated time domain data is finally transmitted through the radio frequency link.

In FIG. 3, DAC-RF represents a digital-to-analog converter with a radio frequency.

The filter function for the filtering operation is a root raised cosine function (or a raised cosine function).

The frequency domain data point multiplied by the root raised cosine filter function (the characteristic of the filter function is that the modulus of the function value at the middle is greater than the modulus of the function value at the edge) is equivalent to convolution operation of the time domain data and the root raised cosine function in a time domain form (non-sinc function; sinc function has a long tail). Since the tail attenuation of the root raised cosine function in the time domain form is relatively fast, the crosstalk of the data portion of the data symbol block to the sequence inserted at the tail may be reduced. In this way, it may be ensured that the tail of the former OFDM symbol is the CP of the latter OFDM symbol after oversampling. Moreover, in a case where the root raised cosine function is adopted for filtering, the PAPR of the time domain data after IDFT may be even lower.

Figure 4:
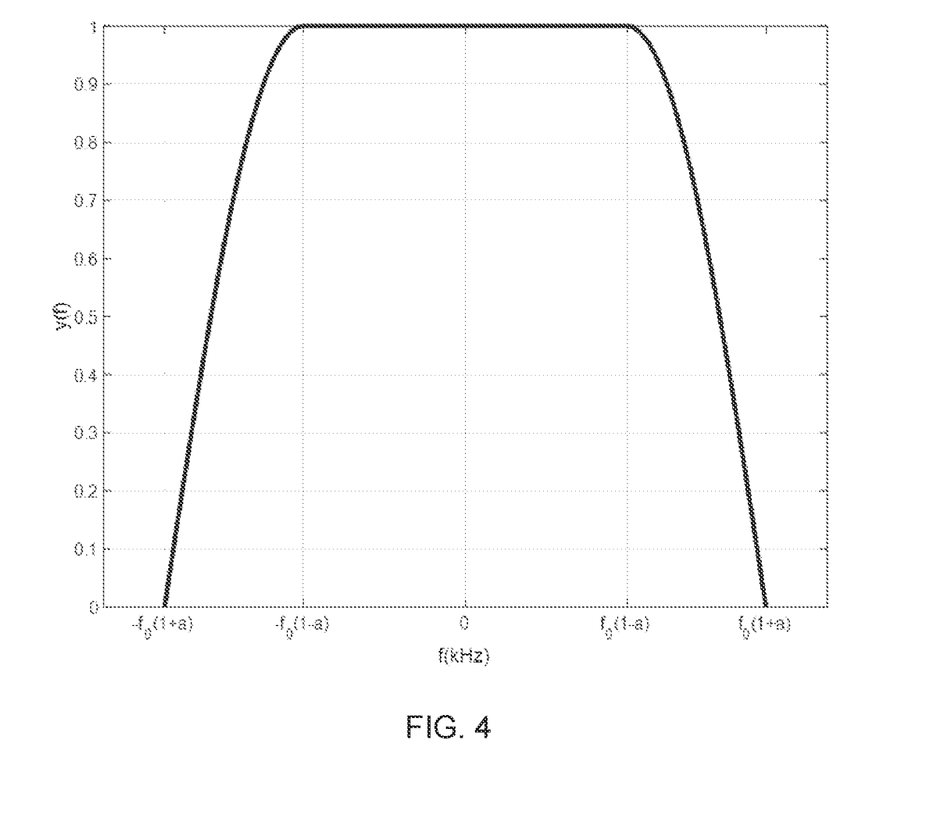
FIG. 4 is a graph showing a curve of a root raised cosine function provided by embodiments of the present disclosure.

In an embodiment, a graph showing a curve of a root raised cosine function is provided. As shown in FIG. 4, y(f) represents the root raised cosine function, y represents a dependent variable of the root raised cosine function, f represents an independent variable of the root raised cosine function, and a unit of f is kHz.

The length of the root raised cosine function in the frequency domain is $2f_0(1+a)$, where $f_0$ is half of the half-value width of the frequency domain raised cosine function in the frequency domain, and a is a roll-off factor. The modulus of the filter function value at the middle ($[-f_0(1-a), f_0(1-a)]$) of the transmission band of the root raised cosine function is greater than the modulus of the filter function value at the edge (a left side of the transmission band $[-f_0(1+a), -f_0(1-a)]$, and a right side of the transmission band $[f_0(1-a), f_0(1+a)]$). The transmission band of the root raised cosine function is an interval of the independent variable in the frequency domain corresponding to the non-zero function value. In addition, it can be seen that: in the interval of the independent variable in the frequency domain corresponding to the non-zero function value, as the independent variable changes from the intermediate point to the boundary, the modulus of the function value decreases monotonically; the modulus of any function value in the intermediate area at half of the length of the interval is greater than or equal to the modulus of the function value in the side area; at the boundary of the interval, the modulus of the filter function value becomes smaller and smaller until it approaches 0.

Figure 5:
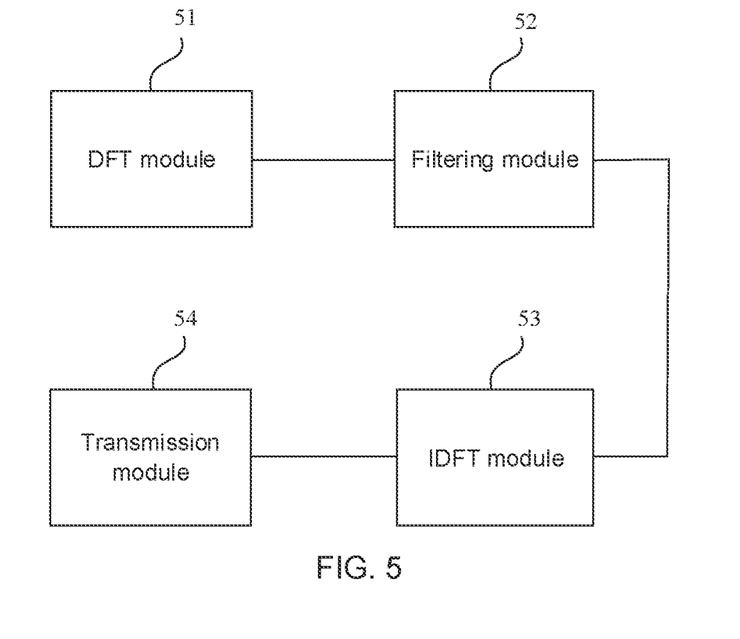
FIG. 5 is a schematic diagram showing a structure of a data transmission apparatus provided by embodiments of the present disclosure.

In an embodiment, a data transmission apparatus is provided. As shown in FIG. 5, the data transmission apparatus provided in this embodiment mainly includes a DFT module 51, a filtering module 52, an IDFT module 53, and a transmission module 54.

The DFT module 51 is configured to perform M-point DFT on first time domain data to obtain frequency domain data.

The filtering module 52 is configured to perform a filtering operation on the frequency domain data to obtain filtered frequency domain data.

The IDFT module 53 is configured to perform N-point IDFT on the filtered frequency domain data to obtain second time domain data.

The transmission module 54 is configured to transmit the second time domain data on a physical resource.

In an exemplary embodiment, the first time domain data is contained in L data symbol blocks, and a length of a data symbol block is M. A head of each data symbol block includes a same data sequence, and a tail of each data symbol block includes a same data sequence.

In an exemplary embodiment, R reference signal symbol blocks and L data symbol blocks are included in a time slot. A head of a reference signal symbol block includes a same data sequence as the head of the data symbol block, and a tail of the reference signal symbol block includes a same data sequence as the tail of the data symbol block.

In an exemplary embodiment, a reference sequence in the reference signal symbol block includes at least one of: a sequence obtained after binary phase shift keying (BPSK) modulation, a Zadoff-Chu sequence, or a Golay sequence.

In an exemplary embodiment, a filter function used in the filtering operation includes a root raised cosine function or a raised cosine function.

In an exemplary embodiment, an expression of the raised cosine function y(f) in frequency domain is as follows:

$$y(f) = \begin{cases} A & 0 \le |f| < f_0(1-\alpha) \\ \frac{A}{2}(1 + \cos(\frac{|f| - f_0(1-\alpha)}{2f_0\alpha}\pi)) & f_0(1-\alpha) \le |f| < f_0(1+\alpha) \\ 0 & |f| \ge f_0(1+\alpha) \end{cases}$$

Where A is a constant, a is a roll-off factor, a is any value between 0 and 1, |.| is an absolute value operator, and $f_0$ is half of a half-value width of the raised cosine function.

In an exemplary embodiment, the root raised cosine function is a square root of the raised cosine function.

In an exemplary embodiment, in a case where a roll-off factor of the root raised cosine function is greater than 0, the half-value width of the root raised cosine function is less than or equal to the length of the data symbol block before the filtering operation.

In an exemplary embodiment, a filter function used in the filtering operation satisfies the following condition: in an interval of an independent variable corresponding to a non-zero filter function value, a modulus of a filter function value at the middle is greater than a modulus of a filter function value in an edge area.

In an exemplary embodiment, the description that the modulus of the filter function value at the middle is greater than the modulus of the filter function value in the edge area includes that: as the independent variable changes from an intermediate value to a boundary value, a modulus of a filter function value corresponding to the independent variable decreases monotonically.

In an exemplary embodiment, the description that the modulus of the filter function value at the middle is greater than the modulus of the filter function value in the edge area includes that: a modulus of any filter function value in an area of the independent variable, a length of which is half of a total length of the interval of the independent variable, is greater than or equal to a modulus of a filter function value in an adjacent area.

In an exemplary embodiment, the description that the modulus of the filter function value at the middle is greater than the modulus of the filter function value in the edge area includes that: as the independent variable changes from the intermediate value to the boundary value, a modulus of a filter function value corresponding to the independent variable decreases monotonically, and the modulus of the filter function value corresponding to the independent variable approaches 0.

In an exemplary embodiment, a length of a filter function used in the filtering operation is greater than or equal to a length of the frequency domain data before the filtering operation.

In an exemplary embodiment, before performing the filtering operation on the frequency domain data, the data transmission method further includes:
cyclically extending the frequency domain data; or,
copying and lengthening the frequency domain data.

In an exemplary embodiment, a length of a filter function used in the filtering operation is less than or equal to a length of the frequency domain data that has been cyclically extended; or the length of the filter function used in the filtering operation is less than or equal to the length of the frequency domain data that has been copied and lengthened.

In an exemplary embodiment, before performing the filtering operation on the frequency domain data, the data transmission method further includes: placing, at a head of the frequency domain data, a data segment at a tail of the frequency domain data that was copied; and placing, at the tail of the frequency domain data, a data segment at the head of the frequency domain data that was copied.

In an exemplary embodiment, performing the filtering operation on the frequency domain data includes: performing filtering on the frequency domain data using a root raised cosine function, and performing filtering on the frequency domain data using a preset function.

In an exemplary embodiment, transmitting the second time domain data on a physical resource includes: transmitting the second time domain data on a radio frequency link after digital-to-analog conversion is performed on the second time domain data.

The data transmission apparatus provided in this embodiment may perform the data transmission method provided in any embodiment of the present disclosure, and has corresponding functional modules and beneficial effects of performing the method. As for technical details not described in this embodiment, reference may be made to the data transmission method provided in any embodiment of the present disclosure.

Figure 6:
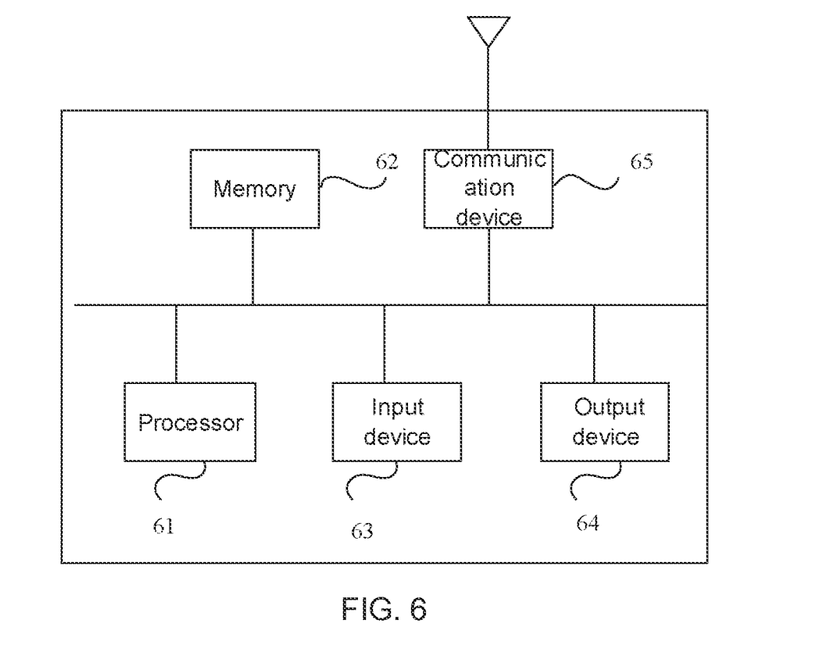
FIG. 6 is a schematic diagram showing a structure of a device provided by embodiments of the present disclosure.

Embodiments of the present disclosure further provide a device, and FIG. 6 is a schematic diagram showing a structure of the device provided by the embodiments of the present disclosure. As shown in FIG. 6, the device includes processor(s) 61, a memory 62, an input device 63, an output device 64 and a communication device 65. The number of the processor(s) 61 included in the device may be one or more, and FIG. 6 shows an example where there is only one processor 61. The processor(s) 61, the memory 62, the input device 63 and the output device 64 in the device can be connected by a bus or other means, and FIG. 6 shows an example where they are connected by a bus.

As a computer-readable storage medium, the memory 62 may be used for storing software programs, computer-executable programs, and modules, such as program instructions/modules corresponding to the data transmission method in the embodiments of the present disclosure (for example, the DFT module 51, the filtering module 52, the IDFT module 53 and the transmission module 54 in the data transmission apparatus). The processor 61 performs a variety of functional applications and data processing of the device by running the software programs, instructions, and modules stored in the memory 62, so as to implement any method provided by the embodiments of the present disclosure.

The memory 62 may mainly include a storage program area and a storage data area. The storage program area may store operating systems, and at least one application required for the function. The storage data area may store data created according to the use of the device, etc. In addition, the memory 62 may include a high-speed random access memory, and may also include a non-volatile memory, for example, at least one disk memory, a flash memory, or other non-volatile solid-state memory. In some examples, the memory 62 may include memories located remotely with respect to the processor 61, and these remote memories may be connected to the device via a network. Examples of the network include the Internet, corporate intranets, local area networks, mobile communication networks, and combinations thereof.

The input device 63 may be configured to receive input digital or character information, and generate key signal input related to user settings and function control of the device. The output device 64 may include a display device such as a display screen.

The communication device 65 may include a receiver and a transmitter. The communication device 65 is configured to send and receive information under control of the processor 61.

In an exemplary embodiment, embodiments of the present disclosure further provide a storage medium having stored thereon computer-executable instructions. The computer-executable instructions, when executed by a computer processor, implement a data transmission method, which includes:
performing M-point DFT on first time domain data to obtain frequency domain data;
performing a filtering operation on the frequency domain data to obtain filtered frequency domain data;
performing N-point IDFT on the filtered frequency domain data to obtain second time domain data; and
transmitting the second time domain data on a physical resource.

Of course, as for the storage medium including computer-executable instructions provided by the embodiments of the present disclosure, the computer-executable instructions not only correspond to the operation of the method described above, but may also perform related operations in the data transmission method provided by any embodiment of the present disclosure.

Through the above description of the implementation methods, those skilled in the art can clearly understand that the present disclosure may be implemented with the help of software and necessary general hardware, and of course, may also be implemented through hardware. However, in many cases, the former implementation method is better. Based on this understanding, the essence of the embodiments of the present disclosure or the part that contributes to related technologies may be embodied in the form of a software product. The computer software product may be stored in a computer-readable storage medium, such as a computer floppy disk, a read-only memory (ROM), a random access memory (RAM), a flash memory (FLASH), a hard disk or an optical disk, which includes a number of instructions for enabling a computer device (such as a personal computer, a server, or a network device) to perform the method described in the embodiments of the present disclosure.

Those skilled in the art will understand that the term "user terminal" covers any suitable type of wireless user equipment, such as a mobile phone, a portable data processing device, a portable web browser, or a vehicle-mounted mobile station.

Various embodiments of the present disclosure may be implemented in hardware or dedicated circuits, software, logic, or any combination thereof. For example, some aspects may be implemented in hardware, while other aspects may be implemented in firmware or software that can be executed by a controller, a microprocessor, or other computing devices.

The embodiments of the present disclosure may be implemented by using a data processor of a mobile device to execute computer program instructions, for example, in a physical processor, or through hardware, or through a combination of software and hardware. Computer program instructions may be assembly instructions, instruction set architecture (ISA) instructions, machine instructions, machine-related instructions, microcode, firmware instructions, state setting data, or source code or object code written in any combination of one or more programming languages.

The block diagram of any logic process in the drawings of the present disclosure may represent program steps, or may represent interconnected logic circuits, modules, and functions, or may represent a combination of program steps, logic circuits, modules, and functions. Computer programs may be stored on the memory. The memory may be of any type suitable for the local technical environment and may be implemented by using any suitable data storage technology, such as read-only memory (ROM), random access memory (RAM), or optical memory device and system (digital multi-function disk DVD or CD disk). The computer-readable medium may include a non-instantaneous storage medium. The data processor may be of any type suitable for the local technical environment, such as general purpose computer, special purpose computer, microprocessor, digital signal processor (DSP), application specific integrated circuits (ASIC), field programmable gate array (FGPA), and processors based on multi-core processor architectures.

Through exemplary and non-limiting examples, the foregoing provides a description of the exemplary embodiments of the present disclosure.

What is claimed is:

1. A data transmission method applied to a transmitting node, the data transmission method comprising:
   performing M-point discrete Fourier transform (DFT) on first time domain data to obtain frequency domain data;
   performing a filtering operation on the frequency domain data to obtain filtered frequency domain data;
   performing N-point inverse discrete Fourier transform (IDFT) on the filtered frequency domain data to obtain second time domain data; and
   transmitting the second time domain data on a physical resource;
   wherein the first time domain data is contained in L data symbol blocks, a length of a data symbol block in the L data symbol blocks is M, a head of each data symbol block includes a same data sequence, and a tail of each data symbol block includes a same data sequence.

2. The method according to claim 1, wherein R reference signal symbol blocks and the L data symbol blocks are included in a time slot, a head of a reference signal symbol block includes a same data sequence as the head of the data symbol block, and a tail of the reference signal symbol block includes a same data sequence as the tail of the data symbol block.

3. The method according to claim 2, wherein a reference sequence in the reference signal symbol block includes at least one of:
   a sequence obtained after binary phase shift keying (BPSK) modulation, a Zadoff-Chu sequence, or a Golay sequence.

4. The method according to claim 1, wherein a filter function used in the filtering operation is a root raised cosine function or a raised cosine function.

5. The method according to claim 4, wherein an expression of the raised cosine function y(f) in frequency domain is as follows:

$$y(f) = \begin{cases} A & 0 \le |f| < f_0(1-\alpha) \\ \frac{A}{2}(1 + \cos(\frac{|f| - f_0(1-\alpha)}{2f_0\alpha}\pi)) & f_0(1-\alpha) \le |f| < f_0(1+\alpha) \\ 0 & |f| \ge f_0(1+\alpha) \end{cases}$$

wherein A is a constant, a is a roll-off factor, a is any value between 0 and 1, |.| is an absolute value operator, and $f_0$ is half of a half-value width of the raised cosine function.

6. The method according to claim 4, wherein the root raised cosine function is a square root of the raised cosine function.

7. The method according to claim 4, wherein in a case where a roll-off factor of the root raised cosine function is greater than 0, a half-value width of the root raised cosine function is less than or equal to the length of the data symbol block before the filtering operation.

8. The method according to claim 1, wherein a filter function used in the filtering operation satisfies a following condition:
   a modulus of a filter function value at the middle of an interval of an independent variable corresponding to a non-zero filter function value is greater than a modulus of a filter function value in an edge area of the interval of the independent variable.

9. The method according to claim 8, wherein that the modulus of the filter function value at the middle is greater than the modulus of the filter function value in the edge area of the interval of the independent variable, includes that:
   as the independent variable changes from an intermediate value to a boundary value, a modulus of a filter function value corresponding to the independent variable decreases monotonically.

10. The method according to claim 8, wherein that the modulus of the filter function value at the middle is greater than the modulus of the filter function value in the edge area of the interval of the independent variable, includes that:
    a modulus of any filter function value in an area of the independent variable, a length of which is half of a length of the interval of the independent variable, is greater than or equal to a modulus of a filter function value in an adjacent area.

11. The method according to claim 8, wherein that the modulus of the filter function value at the middle is greater than the modulus of the filter function value in the edge area of the length interval of the independent variable, includes that:
    as the independent variable changes from an intermediate value to a boundary value, a modulus of a filter function value corresponding to the independent variable decreases monotonically, and a modulus of the filter function value corresponding to the independent variable approaches 0.

12. The method according to claim 1, wherein a length of a filter function used in the filtering operation is greater than or equal to a length of the frequency domain data before the filtering operation.

13. The method according to claim 1, wherein before performing the filtering operation on the frequency domain data, the method further comprises:
    cyclically extending the frequency domain data; or
    copying and lengthening the frequency domain data.

14. The method according to claim 13, wherein a length of a filter function used in the filtering operation is less than or equal to a length of the frequency domain data that has been cyclically extended; or the length of the filter function used in the filtering operation is less than or equal to a length of the frequency domain data that has been copied and lengthened.

15. The method according to claim 1, wherein before performing the filtering operation on the frequency domain data, the method further comprises:
    placing, at a head of the frequency domain data, a data segment at a tail of the frequency domain data that was copied; and
    placing, at the tail of the frequency domain data, a data segment at the head of the frequency domain data that was copied.

16. The method according to claim 1, wherein performing the filtering operation on the frequency domain data includes:
    performing filtering on the frequency domain data using a root raised cosine function, and then performing filtering on the filtered frequency domain data using a preset function.

17. The method according to claim 1, wherein transmitting the second time domain data on a physical resource includes:
    transmitting the second time domain data on a radio frequency link after digital-to-analog conversion is performed on the second time domain data.

18. A device, comprising:

one or more processors; and
a memory configured to store one or more programs, wherein
the one or more programs, when executed by the one or more processors, cause the one or more processors to implement the data transmission method according to claim 1.

19. A non-transitory computer-readable storage medium having stored thereon a computer program, wherein the computer program, when executed by a processor, implements the data transmission method according to claim 1.

* * * * *

UNITED STATES PATENT AND TRADEMARK OFFICE
CERTIFICATE OF CORRECTION

| | |
|---|---|
| PATENT NO. | : 12,107,715 B2 |
| APPLICATION NO. | : 18/014718 |
| DATED | : October 1, 2024 |
| INVENTOR(S) | : Yu Xin et al. |

It is certified that error appears in the above-identified patent and that said Letters Patent is hereby corrected as shown below:

In the Specification

In Column 7, Line 56, please change "Where A is a constant, a is a roll-off factor, a is any value" to --Where A is a constant, α is a roll-off factor, α is any value--

In the Claims

In Column 11, Line 48, please change "wherein A is a constant, a is a roll-off factor, a is any value" to --wherein A is a constant, α is a roll-off factor, α is any value--

Signed and Sealed this
Twenty-first Day of January, 2025

Coke Morgan Stewart
*Acting Director of the United States Patent and Trademark Office*